June 29, 1926.
O. KAHN
1,590,833
PUNCH AND DIE FOR CUTTING ANGLE AND T IRONS
Filed Dec. 2, 1925
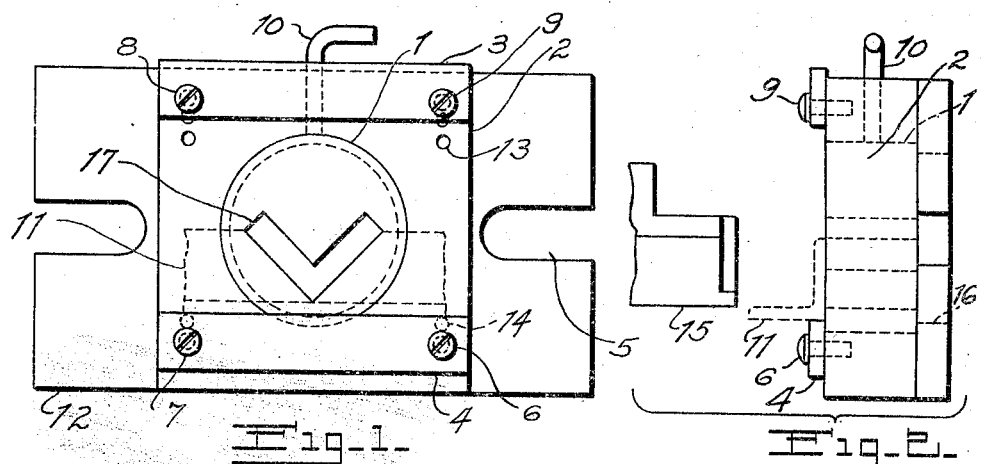
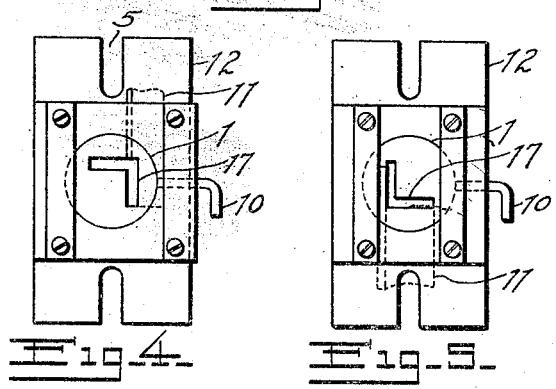
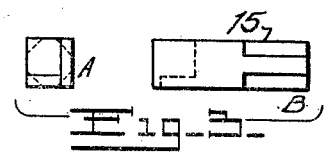
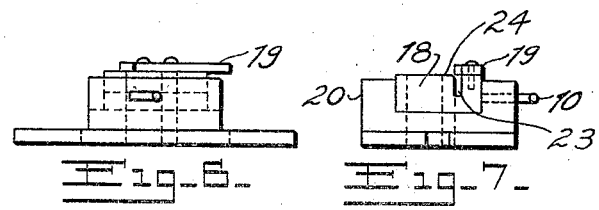
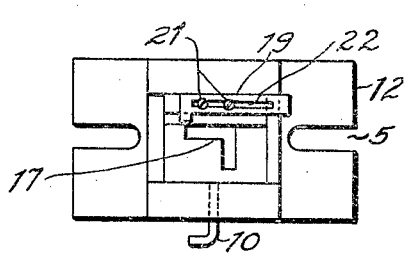
Inventor
Otto Kahn
By Adam E. Fisher
Attorney Patented June 29, 1926.

1,590,833

UNITED STATES PATENT OFFICE.

OTTO KAHN, OF BALTIMORE, MARYLAND.

PUNCH AND DIE FOR CUTTING ANGLE AND T IRONS.

Application filed December 2, 1925. Serial No. 72,727.

This invention relates to punch and die equipment for cutting steel angles and T bars.

An object of the invention is to provide a method of metal cutting that will quickly and cheaply adapt any standard punch press for working steel angles and T bars.

Another object is to provide a simple and therefore economical design for the work specified that will meet the many requirements of working steel angles and T bars in preparing same for fabrication.

These objects are attained by my invention as will be apparent to those skilled in the art from the specification and drawings attached, In which—

Figure 1 is a top or plan view of the die;

Figure 2 is an end view of die and part side view of punch to show the latter approaching die for an operation in notching a steel angle;

Figure 3 is a detail of the punch, an end view being shown at "A" and side view at "B";

Figure 4 is a plan view of die to show adjustment of rotatable center piece for another cutting operation;

Figure 5 is a plan view showing another setting of the die for a third cutting operation;

Figure 6 is an end view of a modification of my invention, designed for cutting steel T bars etc;

Figures 7 and 8 are side and plan views respectively of the modification.

Like numbers denote like parts throughout the several views.

Having particular reference to the drawings, Figures 1 and 2 show the die set for notching either flange of an angle, said notch having sides ninety degrees apart, thus forming a V. This set-up is also used for trimming ends of angles to forty-five degrees. 1 indicates the central die piece in which is formed the punch opening 17. The center piece 1 is round and is rotatable in a horizontal plane in a socket formed in the die block 2, being fastened in position by the hand screw 10 when set at the desired point. The die block 2 is rectangular in form and is mounted upon or is made integrally on the base plate 12. Guides or gages 3 and 4 on the block 2 are adjustably fastened by the screws 6, 7, 8 and 9, and act as retainers for spotting the work to be cut. 5 are U slots for fastening base plate 12 and thus the entire die, to work table of punch press. The dotted outline 11 indicates position of an angle in which a 90 degree V cut is being made. 13 are tapped screw holes for fastening guides or gages 3 and 4 for various cutting operations. 14 are holes for like purpose. 15 indicates the punch which is constructed as shown in Figure 3, the cutting end being in the form of an angle similar to the opening 17 into which it extends when finishing a cut. One part of this cutting face is set slightly ahead of the other part to reduce face pressure. The tang of the punch is octagonal to fit a socket of like shape in a press ram. It may thus be set to correspond with any location of the opening 17 that will register with the steps of forty-five degrees formed by the center of the tang facets. 16 indicates an opening through base plate 12 which permits droppage of scraps punched into opening 17, which is placed over an opening in the press work table.

Figure 4 is a top view of the die shown in Figure 1, the center piece 1 being set at a different point for another operation.

Figure 5 shows an identical view with center piece set for still another operation.

Figures 6, 7 and 8 show a modification of the invention which is adapted to cutting T bars. The center piece 18, corresponds to the part 1 in Figure 1, but is rectangular in form and is provided with a different type of guide or gage 19 and slot 23 in which one-half of the T bar flange extends while the web rests on the center piece at 24 for cutting. The center 18 is slidably set in the block 20 and is fastened by means of the hand screw 10. With the exception of the design of the center piece 18, the modification is identical with the die shown in Figure 1 and uses the punch shown in Figure 3.

Numerous advantages of a die of this kind will be readily appreciated by those skilled in the art and though I have described a preferred embodiment of my invention, it is nevertheless to be understood that many minor changes can be made therein without departing from the spirit or scope of the invention claimed.

Having thus described my invention, I claim:

A combination embodying a base plate with openings for fastening bolts; a die block of rectangular form mounted or made integrally upon said base plate and formed with a central opening for the die proper; a round rotatable die center; means for fastening said die center within the die block; guides or gages on the die block for guiding work to be cut; means for setting said gages or guides and means for fastening same.

In testimony whereof I affix my signature.

OTTO KAHN.